A. A. McLAUGHLIN, E. S. MILLS & H. B. BANNISTER.
SPOKE MITERING MACHINE.
APPLICATION FILED JAN. 28, 1911.
1,012,885.
Patented Dec. 26, 1911.
3 SHEETS—SHEET 1.
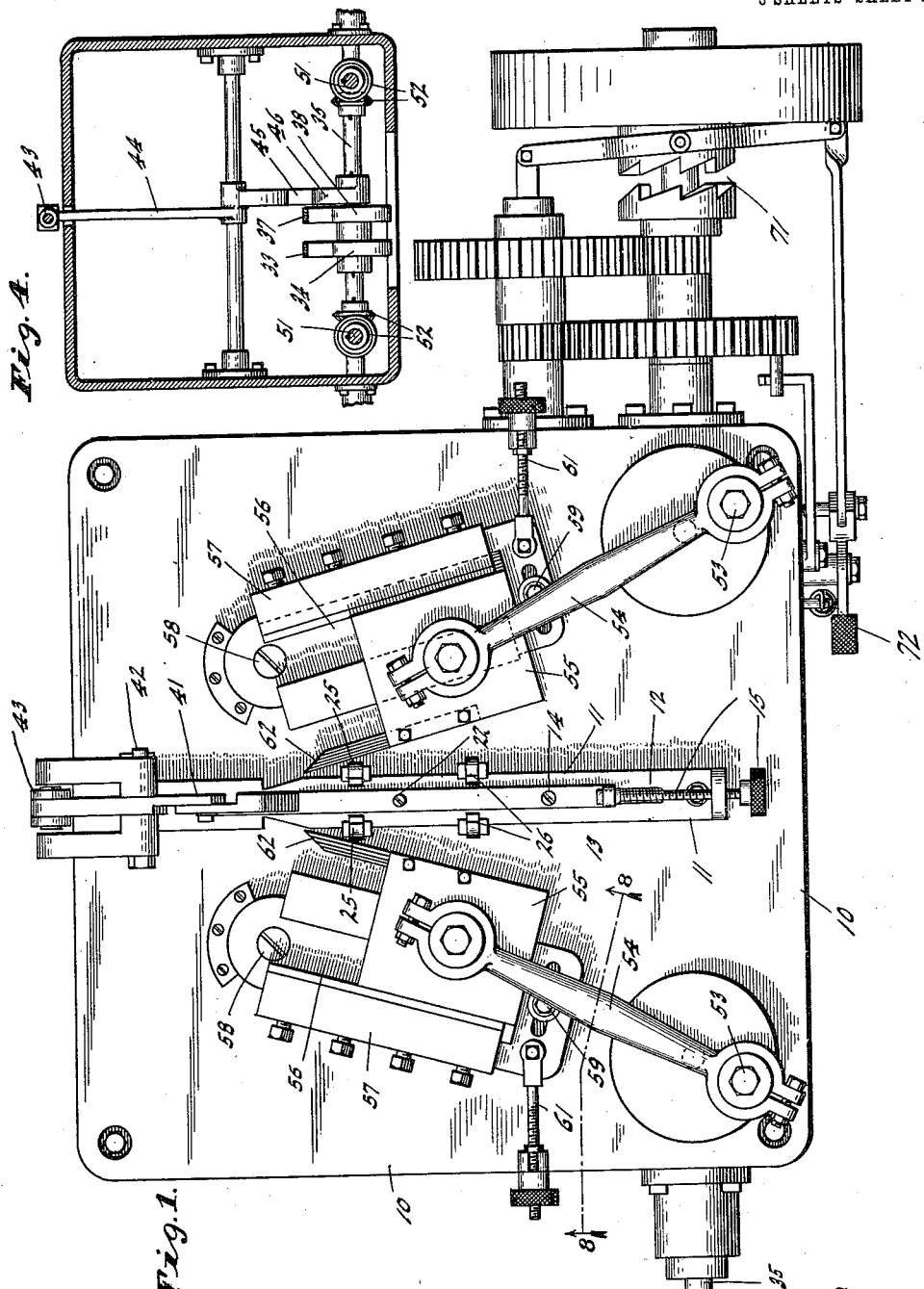
Witnesses
Frank O. Fahl
Thomas W. McMeans
Inventors
Andrew A. McLaughlin
Emory S. Mills
Harry B. Bannister
By Bradford Hood
Attorneys

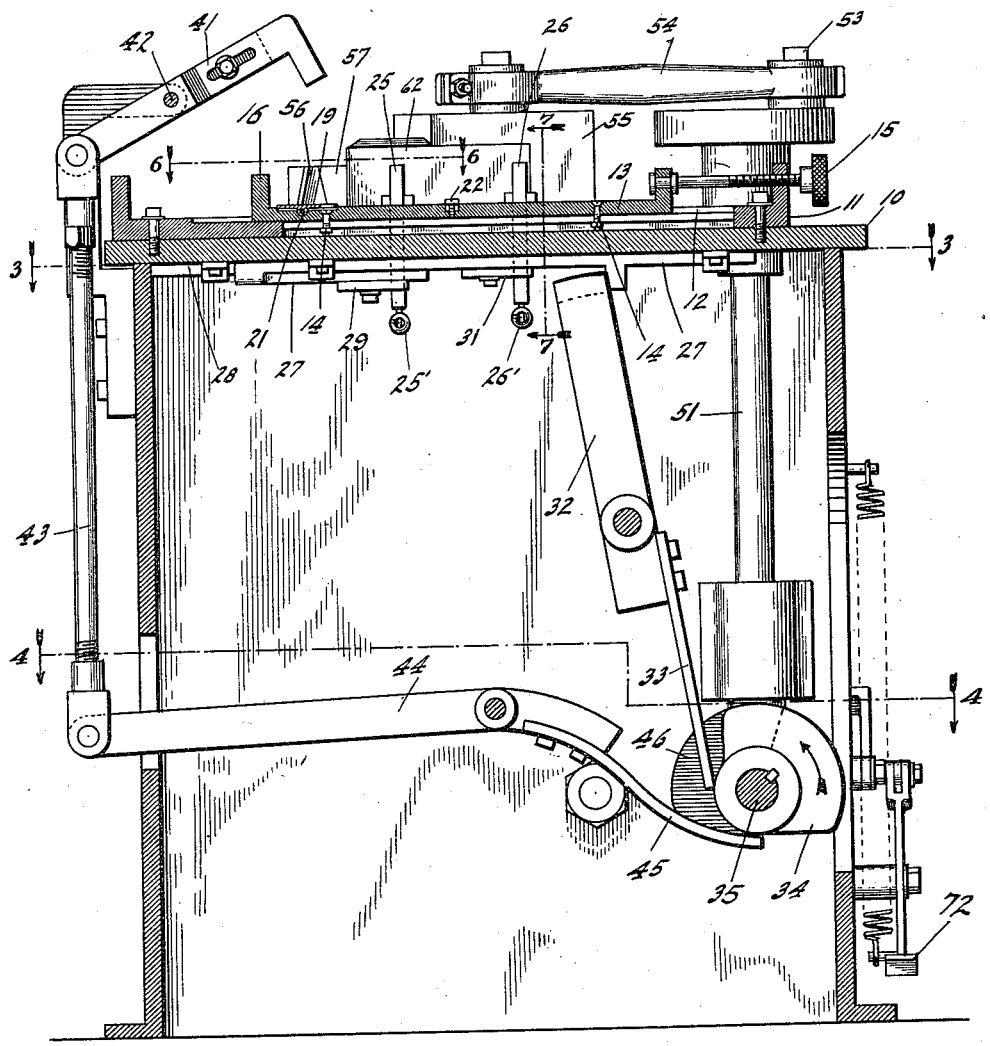

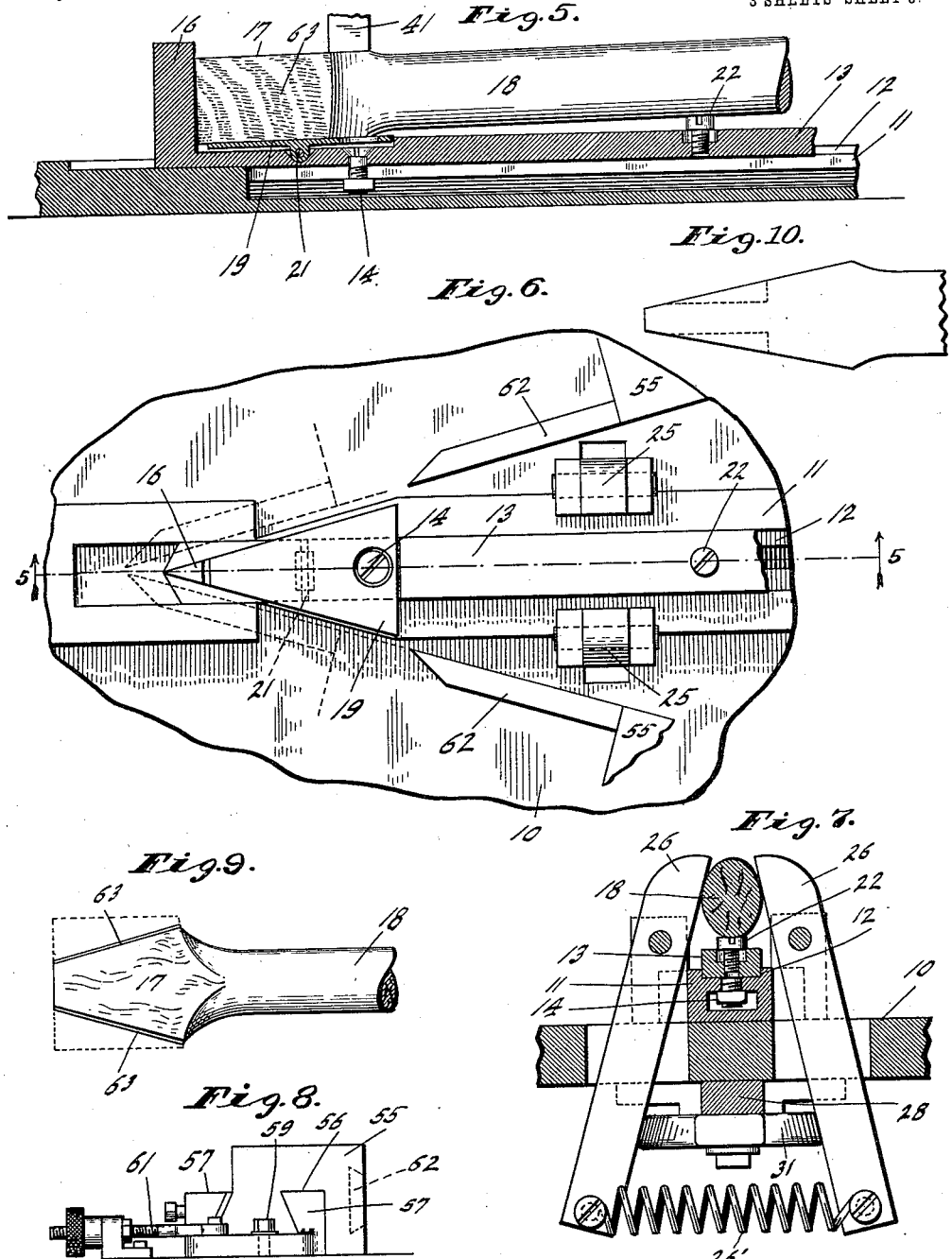

UNITED STATES PATENT OFFICE.

ANDREW A. McLAUGHLIN, EMORY S. MILLS, AND HARRY BRUCE BANNISTER, OF MUNCIE, INDIANA, ASSIGNORS TO MUNCIE WHEEL COMPANY, OF MUNCIE, INDIANA, A CORPORATION OF INDIANA.

SPOKE-MITERING MACHINE.

1,012,885.      Specification of Letters Patent.      Patented Dec. 26, 1911.

Application filed January 28, 1911. Serial No. 605,278.

*To all whom it may concern:*

Be it known that we, ANDREW A. McLAUGHLIN, EMORY S. MILLS, and HARRY B. BANNISTER, citizens of the United States, residing at Muncie, in the county of Delaware and State of Indiana, have invented a new and useful Spoke-Mitering Machine, of which the following is a specification.

The object of our invention is to produce a machine by means of which the hub ends of spoke blanks may be very rapidly, accurately and smoothly beveled.

The accompanying drawings illustrate our invention.

Figure 1 is a plan of a machine embodying our invention; Fig. 2 a vertical section; Fig. 3 a fragmentary section on line 3—3 of Fig. 2; Fig. 4 a section, on a reduced scale, on line 4—4 of Fig. 2; Fig. 5 a section on line 5—5 of Fig. 6; Fig. 6 a fragmentary plan of the parts shown in Fig. 5 with the spoke removed, (the view plane being indicated by line 6—6 in Fig. 2); Fig. 7 a section, on an enlarged scale on line 7—7 of Fig. 2 but with the spoke in place; Fig. 8 an elevation on line 8—8 of Fig. 1, Fig. 9 a fragmentary plan of a spoke, and Fig. 10 a fragmentary plan of another spoke.

In the drawings, 10 indicates a suitable supporting table having a supporting bracket 11 secured centrally to its upper face. The bracket 11 is provided with a longitudinal guide way 12 in which is adjustably mounted a spoke holder 13 which may be clamped in any desired position in the guide way 12 by means of suitable clamping bolts 14. The spoke holder 13 may be adjusted and partially held by means of an adjusting screw 15. At one end, holder 13 is provided with an upwardly extending finger 16 which forms an abutment for the hub end 17 of the spoke 18. Adjacent the abutment 16 on carrier 13 is a tilting plate 19 supported upon a horizontal pivot 21 in order to provide a somewhat extended support for the hub end of the spoke, to be tilted vertically in order that the beveled surfaces of the hub end of the spoke may be slightly converged to provide for the proper setting of the spoke in a dished wheel. The amount of convergence of the beveled surfaces of the spoke will be determined by means of a temper screw 22 mounted in the spoke holder 13 and forming a support for the spoke at a point distant from plate 19.

Pivoted upon the spoke holder 13 are two pairs of centering levers 25, 25 and 26, 26. The upper ends of these levers extend above the spoke receiving portion of the holder and are adapted to grasp the spoke between them. The lower ends of the levers are normally drawn together by light springs 25' and 26' respectively. Slidably mounted in suitable guides upon the under face of table 10 are two slides 27 and 28, for operating the centering levers 25, 25 and 26, 26. Slide 27 carries a wedge 29 which may be projected between the lower ends of levers 25 and slide 28 carries a similar wedge 31 which may be projected between the lower ends of levers 26. Slide 27 is intermittently moved by means of a lever 32 provided with a heavy spring tip 33 engaged by cam 34 on the main drive shaft 35. Slide 28 is intermittently reciprocated by a similar lever 36 (Fig. 3) provided with a spring 37 engaged by a cam 38, also on shaft 35.

In order to clamp the spoke 18 firmly upon the holder 13 we provide a swinging clamping finger 41 pivoted at 42 above the work table and connected by a link 43 with a lever 44 which is provided with a heavy spring tip 45 engaged by a cam 46 on shaft 35.

Extended up through the work table 10, upon opposite sides of the spoke holder, are two similar shafts 51, 51 connected by suitable one-to-one gears 52 with shaft 35. The upper end of each shaft 51 carries a wrist pin 53 upon which is journaled a pitman 54 and this pitman is connected to a cutter head 55 which is mounted in a suitable guide way 56 formed in a supporting head 57. Each supporting head is pivotally mounted upon the table 10, at 58, and is held in any desired angular adjustment by means of a clamping bolt 59 and a temper screw 61. Each cutter head 55 carries a cutter, preferably a slicing knife 62, which may be projected transversely of the spoke in a cutting plane converging toward the axis of the spoke. The cutting planes of the two cutters 62 converge to a greater or lesser extent depending upon the angular adjustment of the heads 57 but, in the form shown, both of said cutters are in planes substantially at right angles to the axial plane of the spoke holder but, by adjusting the temper screw 22, the axis of the spoke may be vertically tilted relative to the lines of travel of the two cutters so that the cutting effect of the cutters upon the spoke will be such as to produce two surfaces 63, 63 which converge in two planes. This two plane convergence (illustrated in Fig. 9 in a somewhat exaggerated form) is provided to arrange for the dish of the wheel.

Any ordinary form of single-throw clutch 71 is provided for driving the machine and the normal position of the parts will be that shown in Fig. 2 with clamping lever 41 raised and the centering levers 25 and 26 with their upper ends separated. The operator will then lay, upon the plate 19 and temper screw 22, a spoke having a hub end of the shape indicated in dotted lines in Fig. 9, whereupon pressure upon the clutch controlling lever 72 will cause the rotation of the shaft 35; which, acting through the parts 46, 45, 44, and 43, will immediately throw the clamping lever 41 tightly down upon the spoke immediately above plate 19, and, acting through the parts 34, 33, 32, and 27, and 38, 37, 36, and 28, will project the wedges 29 and 31 between the lower ends of centering levers 25 and 26 respectively and thus throw the upper ends of said levers inwardly to accurately center the spoke upon the spoke holder, the spring tips 45, 33, and 37 yielding in accordance with the size of the spoke. Immediately thereafter the two cutters 62 will be projected toward each other lengthwise of the spoke and thus, at a single cut, remove from the hub end of the spoke the triangular portion indicated by dotted lines in Fig. 9, thus producing, by a single movement, the two surfaces 63, 63 which will considerably converge toward each other lengthwise of the spoke and will also slightly converge toward each other at right angles to the length of the spoke. Any desired amount of convergence of the surfaces 63 may be obtained by a proper adjustment of the two heads 57 and the temper screw 22.

The spoke may also be operated upon to form any desired tenon, as indicated by the dotted line indicated in Fig. 10. This operation may, of course, be either prior to or subsequent to the operation of the mechanism described and may be conveniently accomplished by the use of a milling cutter.

We claim as our invention:

1. A spoke mitering machine comprising a spoke holder, a tilting bed plate carried by said holder upon an axis substantially at right angles to the spoke, an adjustable spoke support arranged at a distance from said plate longitudinally of the spoke, a pair of slicing cutters arranged to reciprocate in converging planes upon opposite sides of the spoke holder, and means for reciprocating said cutters.

2. A spoke mitering machine comprising a spoke holder, a tilting bed plate carried by said holder upon an axis substantially at right angles to the spoke, an adjustable spoke support arranged at a distance from said plate longitudinally of the spoke, a pair of cutters arranged to reciprocate in converging planes upon opposite sides of the spoke holder, and means for reciprocating said cutters.

3. A spoke mitering machine comprising a spoke holder, a tilting bed plate carried by said holder upon an axis substantially at right angles to the spoke, an adjustable spoke support arranged at a distance from said plate longitudinally of the spoke, a pair of slicing cutters arranged to reciprocate in converging planes upon opposite sides of the spoke holder, means for reciprocating said cutters, a supporting guide-way for each of said cutters, and means for angularly adjusting said guide-way relative to the axis of the spoke holder.

4. A spoke mitering machine comprising a spoke holder, a tilting bed plate carried by said holder upon an axis substantially at right angles to the spoke, an adjustable spoke support arranged at a distance from said plate longitudinally of the spoke, a pair of cutters arranged to reciprocate in converging planes upon opposite sides of the spoke holder, means for reciprocating said cutters, a supporting guide-way for each of said cutters, and means for angularly adjusting said guide-way relative to the axis of the spoke holder.

5. A spoke mitering machine comprising a spoke holder, a tilting bed plate carried by said holder upon an axis substantially at right angles to the spoke, an adjustable spoke support arranged at a distance from said plate longitudinally of the spoke, a pair of slicing cutters arranged to reciprocate in converging planes upon opposite sides of the spoke holder, means for reciprocating said cutters, a spoke clamping finger arranged adjacent the holder and movable toward and from the same, means for automatically moving said finger toward and from active position, a pair of centering levers pivoted upon opposite sides of the axis of the spoke holder, and means for automatically moving said centering levers into and out of engagement with a spoke arranged upon said holder.

6. A spoke mitering machine comprising a spoke holder, a tilting bed plate carried by said holder upon an axis substantially at right angles to the spoke, an adjustable spoke support arranged at a distance from said plate longitudinally of the spoke, a pair of cutters arranged to reciprocate in converging planes upon opposite sides of the spoke holder, means for reciprocating said cutters, a spoke clamping finger arranged adjacent the holder and movable toward and from the same, means for automatically moving said finger toward and from active position, a pair of centering levers pivoted upon opposite sides of the axis of the spoke holder, and means for automatically moving said centering levers into and out of engagement with a spoke arranged upon said holder.

7. A spoke mitering machine comprising a spoke holder, a pair of slicing cutters arranged to reciprocate in converging planes upon opposite sides of the spoke holder, means for reciprocating said cutters, a spoke clamping finger arranged adjacent the holder and movable toward and from the same, means for automatically moving said finger toward and from active position, a pair of centering levers pivoted upon opposite sides of the spoke holder, and means for automatically moving said centering levers into and out of engagement with a spoke arranged upon said holder.

8. A spoke mitering machine comprising a spoke holder, a pair of cutters arranged to reciprocate in converging planes upon opposite sides of the spoke holder, means for reciprocating said cutters, a spoke clamping finger arranged adjacent the holder and movable toward and from the same, means for automatically moving said finger toward and from active position, a pair of centering levers pivoted upon opposite sides of the axis of the spoke holder, and means for automatically moving said centering levers into and out of engagement with a spoke arranged upon said holder.

9. A spoke mitering machine comprising a spoke holder, a pair of cutters arranged upon opposite sides of the axis of said holder and in converging planes, means for moving said cutters relative to the spoke holder to traverse the spoke head in said converging planes, and means for varying the angular position of a spoke in its axial plane between the converging planes of the cutters.

In witness whereof, we have hereunto set our hands and seals at Muncie, Indiana, this 24th day of January, A. D. one thousand nine hundred and eleven.

ANDREW A. McLAUGHLIN. [L. S.]
EMORY S. MILLS. [L. S.]
HARRY BRUCE BANNISTER. [L. S.]

Witnesses:
F. W. SHIDELER,
ROBERT OSCAR BURT.

---

Copies of this patent may be obtained for five cents each, by addressing the "Commissioner of Patents, Washington, D. C."